United States Patent

Wanner

[15] 3,689,053

[45] Sept. 5, 1972

[54] VEHICLE LEVELING UNIT WITH INTEGRAL CONTROL VALVE

[72] Inventor: Joseph W. Wanner, Kettering, Ohio

[73] Assignee: General Motors Corporation, Detroit, Mich.

[22] Filed: Oct. 5, 1970

[21] Appl. No.: 77,829

[52] U.S. Cl.................................................267/65
[51] Int. Cl..................................................F65 5/00
[58] Field of Search ...............267/65 D, 65 C, 65 A; 215/11 B

[56] References Cited

UNITED STATES PATENTS 3,592,458   7/1971   Jackson........................267/65

FOREIGN PATENTS OR APPLICATIONS 612,007   10/1926   France......................215/11 B

*Primary Examiner*—James B. Marbert
*Attorney*—W. S. Pettigrew and J. C. Evans

[57] ABSTRACT

In preferred form, a combination shock absorber and air spring unit of the type including an outer cylindrical member located in telescoping relationship with an outer cylindrical member of the shock absorber which has a piston rod directed therefrom connected to the outer member. One of the telescoping members carries a sealing element that movably seats against the other member to define a sealed variable volume, inflatable chamber having an inlet thereto. A resilient valve seat element on the outer member defines an exhaust path for fluid flow from the chamber. A movable spring valve member is carried on the outer member in spaced relationship to the valve seat element for controlling exhaust flow therethrough. The spring valve member is operated by an actuating arm to move away from and to close against the resilient valve seat for controlling the pressure level in the chamber.

8 Claims, 7 Drawing Figures

PATENTED SEP 5 1972  3,689,053

INVENTOR.
Joseph W. Wanner
BY
J. C. Evans
ATTORNEY

INVENTOR.
Joseph W. Wanner
BY
J.C. Evans
ATTORNEY

VEHICLE LEVELING UNIT WITH INTEGRAL CONTROL VALVE

This invention relates to vehicle levelers and more particularly to vehicle levelers having exhaust type leveling valves mounted integrally thereon for controlling exhaust flow from the leveler.

An object of the present invention is to mount a reliable built-in exhaust valve assembly as an integral part of a vehicle leveler with the operating parts of the valve being sealed within the leveler and wherein a resilient valve seat is replaceable without dismantling the unit.

A further object of the present invention is to provide a low cost valve assembly integrally mounted on a vehicle leveler for exhausting excess fluid from the leveler including a replaceable valve seat and a valving element and operator that use existing space within the pressurizable chamber of the leveler and which operates within a minimum of deflection at low stress conditions.

Still another object of the invention is to provide a single, unitary resilient valve fitting which functions to define a valve seat; an exhaust path wherein orifice control is obtained by means that will flush particulate matter; and to define a sealed outlet opening and means for assuring a flexible seating response when the valve is closed.

These objects and others are attained in one working embodiment that includes a vehicle leveler in the form of a double direct acting hydraulic shock absorber of the type adapted to be connected between the sprung and unsprung mass of a vehicle and which includes an air spring in surrounding relationship to the upper end thereof for producing a resultant force between end connector elements on the shock absorber to supplement the load carrying capacity of a primary suspension spring so as to maintain the sprung mass of the vehicle at a desired height relationship with the unsprung mass.

More particularly, the hydraulic shock absorber has a piston rod directed from a cylindrical member which is connected at one end thereof to an outer first cylindrical member or dust shield which is located in spaced relationship to the first member and is movable in telescoping relationship with respect thereto.

A sleeve of flexible material has one end connected to the outer cylindrical member and the opposite end turned inwardly of the first mentioned end to be secured to the outer surface of the shock absorber so as to define a movable seal between the shock absorber and dust shield which serves to close the space therebetween to define a pressurizable, variable volume control chamber. An inlet fitting to the chamber is adapted to be connected to a source of fluid for continuously directing the air into the chamber.

Height control is obtained by an improved valve assembly located within available space in the reservoir as an integral part of the leveler unit. The assembly includes a multi-purpose unitary resilient valve seat element directed through the dust shield at a point in close proximity to the end closure of the shock absorber through which the piston rod enters and leaves the shock absorber unit. The resilient element includes an outlet opening to atmosphere and a passageway communicating the outlet opening with the inside of the variable volume chamber.

A bracket is secured to the inside surface of the outer wall and it in turn supports an elongated spring element for movement with respect to the valve seat for controlling exhaust flow of air from the variable volume chamber to atmosphere.

More particularly, the spring element is an elongated strap of steel having one end fixedly secured to the bracket end and the opposite end thereof directed into a narrow slotted portion of the bracket at its opposite end for movement between opposite walls of the slot.

A curved end on an actuator arm is fastened through the spring and is rollingly supported on the bracket to be biased by the spring into the fluid chamber. A second curved end thereon is located for movement into overlying relationship with the top end closure of the shock absorber and to a second controlling position where it is wedged between the spring and the side wall of the shock absorber.

When in the first position the actuator arm is positioned to cause the spring to be maintained in an undeflected position between its fixed end and one side of the guide slot in the bracket.

When in the second position the actuator arm flexes the spring between the fixed end and against the other side of the bracket slot to cause a mid portion of the spring to deflect against the resilient element to block flow of fluid therethrough.

Relative movement between the end mounts of the shock absorber produced by changes in the load on the vehicle and normal road movements will cause the actuator arm to be moved between the aforesaid first and second control positions to maintain the end mounts of the shock absorber at or close to a predetermined separation by exhaust control of any excess air flow into the variable volume chamber not required to maintain a desired height relationship.

Further objects and advantages of the present invention will be apparent from the following description, reference being had to the accompanying drawings wherein a preferred embodiment of the present invention is clearly shown.

Figure 1:
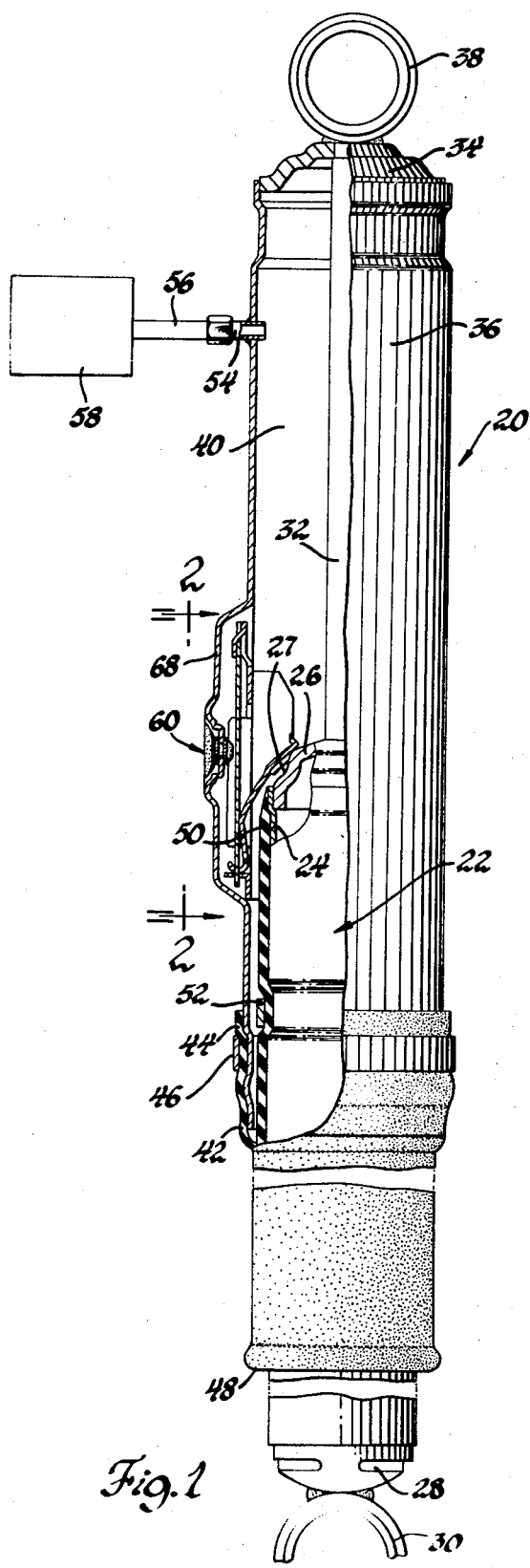
FIG. 1 is a view in side elevation partially broken away and partially in vertical section of a combination shock absorber and air spring unit including an integral exhaust control valve in accordance with the present invention.

Referring now to the drawings i FIG. 1 a vehicle leveler 20 is illustrated of the type adapted to be connected between the sprung and unsprung mass of a vehicle and serving as an auxiliary spring to supplement the load carrying capacity of a primary spring which supports the sprung mass on the unsprung mass.

The invention is illustrated in combination with a particular kind of vehicle leveler of the type that has a variable volume fluid chamber formed by a shock absorber and a rigid surrounding telescoping member.

The invention, however, is applicable to any arrangement wherein a movable abutment such as a part of a shock absorber is telescoped with respect to a second cylindrical member that forms a variable volume chamber into which fluid is directed for maintaining a desired height relationship between a vehicle connected to opposite end mounts of the leveler.

More particularly, in this embodiment the leveler 20 includes a double direct acting hydraulic shock absorber 22 having an outer cylindrical member 24 which is connected at the upper end thereof to an end closure 26 with a stepped shoulder 27 and at the bottom end thereof to an end closure 28.

The end closure 28 is welded to a connecting ring 30 adapted to be connected to the unsprung mass of a vehicle, for example to means on the housing of the rear axle assembly of a vehicle at one side thereof.

An elongated piston rod 32 is directed from the shock absorber 22 through the end closure 26 thereof and in FIG. 1 is shown in an extended position.

The end of the piston rod 32 is connected to a cap 34 that closes the upper open end of an outer cylindrical dust shield member 36.

Also the end of the rod 32 is connected to a mounting ring 38 that is adapted to be connected to the sprung portion of a vehicle such as a bracket on the chassis frame.

The opposite end of the outer cylindrical member 36 is located in telescoping relationship with the outer surface of the cylindrical member 24 to define a variable volume chamber 40 therebetween which has a reduced volume as the piston rod 32 enters the shock absorber 22 and has an increased volume when the shock absorber piston rod 32 is extended outwardly of the shock absorber 22 as shown in FIG. 1.

The variable volume chamber 40 is sealed by a flexible sleeve member 42 which has an outer end 44 thereon sealingly connected to the lower end of the outer cylindrical member 36 by a clamp ring 46.

The sleeve 42 is rolled inwardly at 48 and is arranged in overlying relationship with the outer surface of member 24 of the shock absorber 22.

The inside end 50 of the sleeve is located in close proximity to the end closure 26 and a clamp ring 52 is secured to the end 50 at a point spaced downwardly on the cylindrical member 24 as shown in FIG. 1 for securing the sleeve 42 to the cylindrical member 24.

The sleeve 42 allows relative movement between the shock absorber 22 and the outer cylindrical member 36 in response to road produced movements between the unsprung mass and sprung mass of the vehicle while maintaining a fluid seal between the outer cylindrical member 36 and the shock absorber 22 for sealing the variable volume chamber 40.

In accordance with certain principles of the present invention the leveler 20 includes an inlet fitting 54 connected through the outer cylindrical member 36. A conduit 56 connects a pressure source of fluid 58 to the fitting 54 for continuously directing fluid into the variable volume chamber 40.

When the vehicle height is stabilized a main suspension spring associated with the leveler unit 20 has a selected length and the mounting rings 30, 38 are maintained at a fixed height relationship from one another.

Excess flow into the variable volume chamber 40 will tend to move the rings 30, 38 apart from one another to raise the vehicle above a desired height relationship between the sprung and unsprung mass.

Accordingly, the leveler 20 includes an improved integral valve assembly 60 thereon which controls exhaust of fluid from the variable volume chamber 40 to maintain a desired height relationship between the sprung and unsprung mass of a vehicle by holding a controlled volume of fluid within the variable volume chamber 40 to maintain a desired height relationship between rings 30, 38.

More particularly, the integral valve assembly 60 has three basic operative components including a resilient valve fitting or valve seat element 62, a movable spring valving element 64 and an actuator arm 66.

The assembly 60 is supported within an outwardly bulged portion 68 on one side of the cylindrical member 36. The outwardly bulged portion 68 has a concave surface 70 formed thereon with an opening 72 therethrough in which the resilient valve fitting 62 is fixedly secured.

Figure 2:
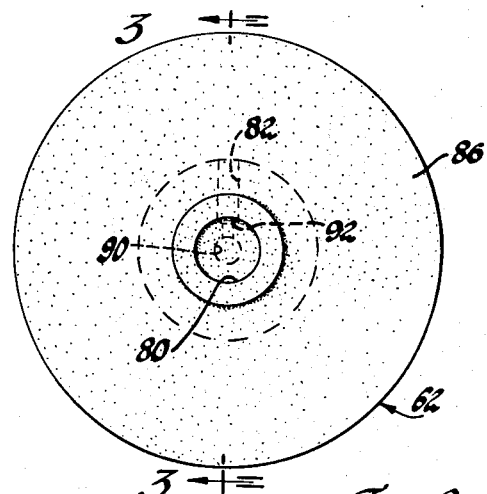
FIG. 2 is an enlarged end elevational view of a resilient valve fitting of the combination looking in the direction of the arrows 2—2 of FIG. 1.
Figure 3:
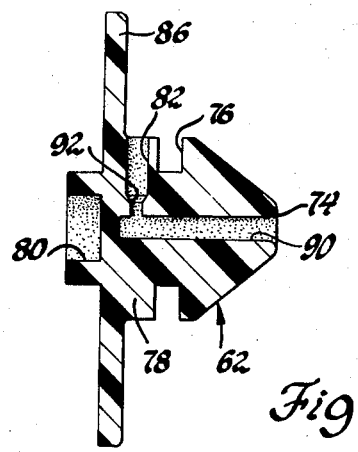
FIG. 3 is a vertical sectional view taken along the line 3—3 of FIG. 2 looking in the direction of the arrows.
Figure 4:
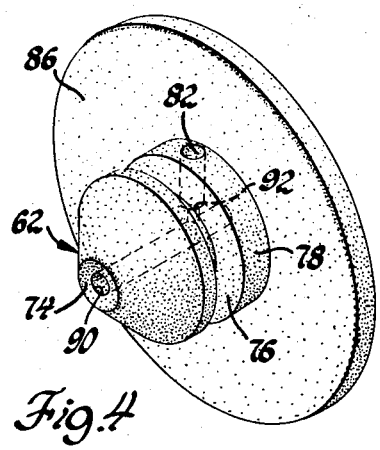
FIG. 4 is a view in perspective of the valve fitting shown in FIGS. 2 and 3.

The valving element 62, as is best illustrated in FIGS. 2 through 4, includes a conically shaped nose portion 74 and an annular groove 76 in a hub portion 78. The annular groove 76 fits onto the concave surface 70 around the opening 72 therethrough for securing the valving element 62 in place thereon.

The hub 78 includes a socket portion 80 in which a tool can be inserted for removing the resilient valve fitting 62 from its seated fixed relationship with the concave surface 70 for replacement from outside the member 36.

Figure 5:
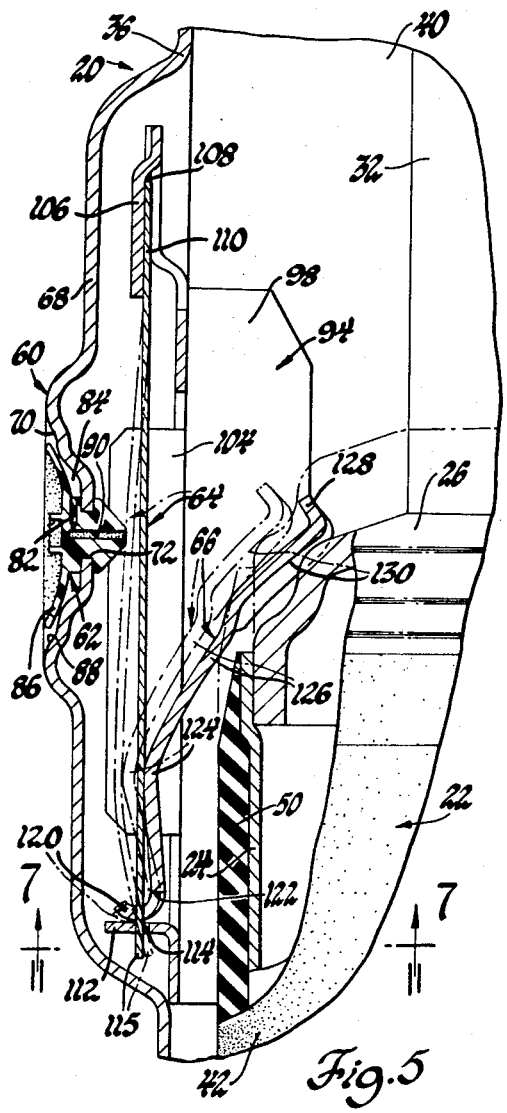
FIG. 5 is a fragmentary vertical sectional view of the operative components of the control valve in an exhaust position.

In accordance with certain principles of the present invention the valving element 62 includes an outlet opening 82 located on the outside of the cylindrical member 36 within the concave surface 70 thereof as is best shown in FIG. 5.

This opening 82 communicates with an annular opening 84 formed between the concave surface 70 and a radially outwardly directed thin sectioned flange 86 on the hub 78 which engages an annular shoulder 88 on the concave surface 70 to be bent outwardly from a normally unstressed right angle relationship to the longitudinal axis of the resilient valve fitting 62 thereby to be slightly spring biased against the shoulder 88 to seal the opening 84 from the outside.

The outlet 80 thus is protected against outside environment around the shock absorber and dirt, moisture and the like is excluded from the annular opening 84.

During exhaust operation of the leveler 20, a passageway 90 along the axis of the valving element 62 is opened to communicate the variable volume chamber 40 with the outlet opening 82 across a control orifice 92 which regulates the amount of air discharged from the variable volume chamber during the exhaust phase.

The valve fitting 62 in one working embodiment is made of Buna N 60 durometer material and the orifice 92 is relatively yieldable and will deflect to allow small particles of dirt to be expelled from the axial passageway 90 through the outlet opening 82 during exhaust phases of operation.

Air flow into the annular opening 84 will cause the flat flange 86 to move outwardly of the shoulder 88 to exhaust to atmosphere.

Figure 7:
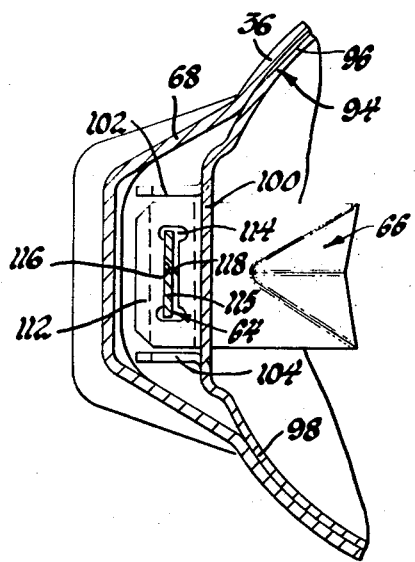
FIG. 7 is a fragmentary horizontal sectional view taken along the line 7—7 of FIG. 5 looking in the direction of the arrows.

The valve assembly 60 also includes a support bracket 94 which has curved sides 96, 98 fixedly secured to the inside surface of the outer cylindrical member 36 on either side of the outwardly bulged portion 68 therein as is best seen in FIG. 7.

The bracket 94 further includes a center segment 100 from which are struck two spaced apart tabs 102, 104 that are directed into the outwardly bulged portion 68 to reinforce the bracket 94 and to define side surfaces for location of the spring element 64 within the assembly.

At the upper end of the bracket 94 the center segment 100 is formed to have a raised lip 106 that is spaced from the center segment 100 to define a space 108 between the lip 106 and the center segment 100 in which the upper end 110 of the elongated spring element 64 is press fit.

The bottom end of segment 100 is stamped outwardly to form a ledge 112 formed at right angles to the center segment 100 and extending into the opening formed by the outwardly bulged portion 68 between the side tabs 102, 104. The ledge 112 has a slot 114 formed therein through which the lower end 114 of the spring element 64 is guidingly directed.

The slot 114 more particularly includes an outer side 116 and an inner side 118 serving as stop surfaces for the bottom end 115 to control the position of the spring element 64 with respect to the nose portion 74 of the resilient valving element 62 when the valve assembly 60 is in an exhaust control position or in a fill control position.

In order to maintain the spring element 64 in these control positions the actuator arm 66 is of a particular configuration which is arranged to operatively connect a movable abutment portion of the leveler device 20 represented by the upper end closure 26 and the side wall of the cylindrical member 24 to the spring element 64.

More particularly, the actuator arm 66 includes a curved end 120 which has a slot 122 therein through which is directed the lower end 115 of the spring element 64 as is best seen in FIG. 5.

The curved end 120 is supported by the ledge 112 for rolling movement thereon. It merges with a straight line segment 124 leading to a cruved end 126 bent over at 128 to form a sharp radius curvature leading into a follower surface defined by a depression 130 in the curved portion 126.

The actuator arm 66 is thereby pivotally connected at the curved end 120 to the spring 64 and is mounted for relatively free rolling movement on the upper surface of the ledge 112.

The opposite end of the actuator arm 66 is biased by the spring 64 inwardly of the variable volume chamber 40 to follow the outer surface of the upper end of the shock absorber 22.

Operation of the device includes a vehicle level phase of operation wherein the vehicle is level and the static load on the vehicle is constant. There are dynamic load changes produced by normal road movements which cause relative sprung movement between the vehicle chassis and its ground engaging suspension assemblies.

During the level phase of operation high pressure fluid from the source 58 is continuously directed into the variable volume chamber 40 causing an increase in pressure therein that will tend to increase the volume of the chamber 40 to move the sprung mass of the vehicle slightly above its level position by a separating movement produced between the top and bottom rings 38, 30.

When the vehicle sprung mass is moved above the desired height relationship by normal road movements the upper end closure 26 will move downwardly of the valve assembly 60 so that the bent end 128 and follower depression 130 thereon will be in engagement with the nose portion of the upper end closure 26 as seen in FIG. 5.

At this point the spring 64 has the movable bottom end 115 thereof maintained in engagement with the outer side 116 and the spring thus assumes a more or less straight line position within the bracket 94 where it is located out of engagement with the valve fitting 62. Thus, any excess air flow into the variable volume chamber 40 which would tend to create a resultant upward force to move the vehicle even further above the desired height relationship will flow freely through the valve fitting 62 and be exhausted across the flange 86 as seen in FIG. 5 to prevent any further over level movement.

During the level phase of operation the vehicle sprung mass can move closer to the unsprung mass below the desired height relationship because of inertial forces on the sprung mass produced by normal road movements.

Figure 6:
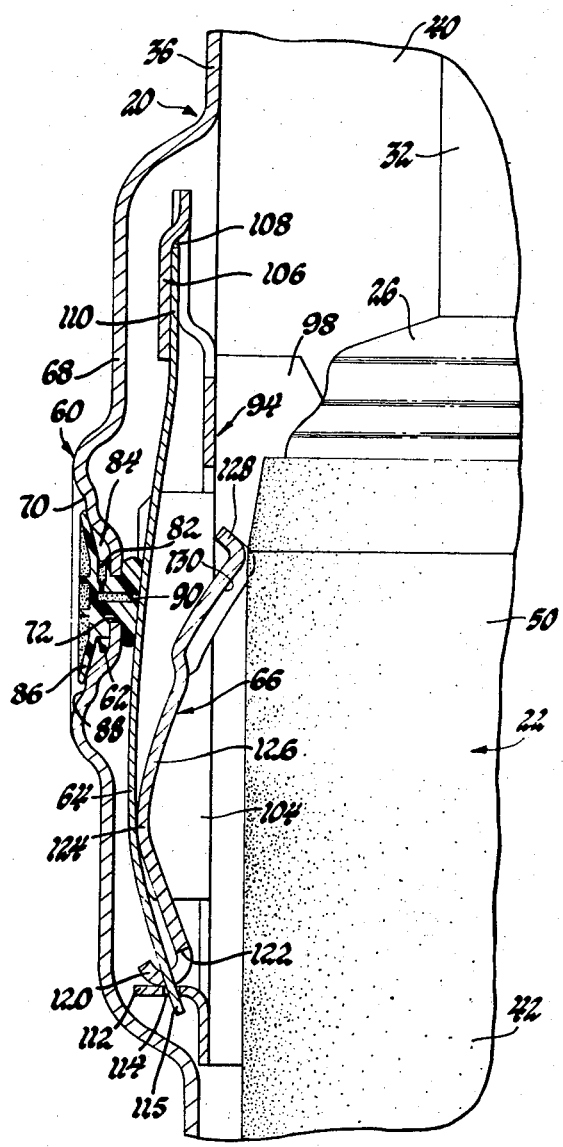
FIG. 6 is a view in FIG. 5 showing the valve in a closed position.

When this happens the valve assembly 60 is first moved to the dotted line position in FIG. 5 which is an initial valve closing position. This occurs following a short compression of the unit. Further compression causes the actuator arm into an overtravel position as shown in FIG. 6. The break line between the straight segment 124 and curved portion 126 moves against the spring element 64 to cause it to bow outwardly between the end 110 thereof and the break line so that a center segment of the spring element 64 will distort the nose-portion to accommodate the valve travel. During this movement the spring 64 at end 110 is adjusted within space 108 and stiffened by element 106 to keep down spring stress.

At this time the free end 115 of the spring 64 is allowed to freely curved against the inner side 118 of the slot 114 to reduce spring deflection and stress.

The arrangement in effect permits the valve assembly to move in a non-interference retraction, out of the way of shock absorber parts that telescope together when the vehicle strikes a bump.

Also, during the closing and opening movement the resilient character of the nose 74 of the element enables it to move transversely of spring 64 to have a flexible response in seating against the spring for positive sealing thereagainst.

The valve opening and closing movements during the level phase are transient and will occur quickly because of the arrangement of the resilient sealing element 62 to the spring blade 64 and the actuator arm 66 as described above.

A fill phase of operation occurs when an additional static load is placed on the vehicle.

This will cause the main vehicle suspension spring to have a shorter length and will cause the end mounts 30, 38 to move closer together so as to move the valve assembly 60 into a position as illustrated in FIG. 6 where the spring 64 is closed against the resilient flexible nose 74.

When the vehicle is so loaded and the valve assembly 60 is forced in the position shown in FIG. 6 the flow of pressurized fluid from the source 58 through the conduit 56 and inlet 54 into the variable volume chamber 40 will be trapped within the variable volume chamber 40 to increase the pressure therein to produce a resultant separating force on the spaced apart rings 30, 38. This tends to spread them apart and produce a supplemental load carrying capacity in addition to that of the main suspension spring. The combination of the load supporting capacity of the leveler unit 20 and the main spring will raise the sprung mass of the vehicle with respect to the unsprung mass to return the vehicle chassis to the desired height relationship and thereby level the vehicle to correct for the additional load.

Yet another phase of operation occurs when the vehicle is unloaded. When this occurs the main suspension spring will cause the vehicle chassis to move apart from the ground engaging suspension components and will thereby cause the valve assembly 60 to have its operative parts in the positions illustrated in FIG. 5.

The resultant effect is to raise the chassis above its desired height relationship with the ground engaging suspension components and the valve assembly is thus open during this condition to allow pressurized air to escape from the variable volume chamber 40 along with the excess air that is being pumped into the variable volume chamber from the source 58 in conduit 56.

As pressure is reduced in the variable volume chamber 40 the resultant force exerted to spread the rings 30, 38 apart is reduced.

The total spring support of the main spring and that of the leveler unit 20 is thereby reduced to a level that will cause the vehicle to return to its correct height relationship at which time the valving assembly 60 will move between its open position of FIG. 5 and the closed position of FIG. 6 in accordance with the road movements of the vehicle as described above under level vehicle operation.

The valve assembly and its operation is accommodated in a limited space within the leveler unit 20 to allow free relative movement between the cylindrical member 36 and the shock absorber 22.

Furthermore, the arrangement of the parts results in a relatively low spring deflection to open and close the valve with commensurately reduced stresses in the component parts. Because of the small movement there is quicker valve closure and opening and this is accomplished merely by moving between the stepped end closure 26 and the side of the shock absorber 22.

The resilient valve fitting 62 is also characterized by having a plurality of functional purposes including that of providing a valve seat to seal against the flat surface of the spring 64. In addition to providing the exhaust passage it includes a restricted orifice for regulating the exhaust flow during and in response to normal road movements of the vehicle to prevent unwanted pressure loss in the chamber 40 during normal road movements. It also seals an outlet at the dust shield wall to protect against undesirable external environmental influences. A further feature is that the valve can be replaced from the outside of the shock absorber and is located within the recessed surface 70 to be protected against scrape-off action that might tend to dislodge it from its operative position.

As pointed out above, the particular valve additionally has a flexible response to seating because of the configuration of the nose portion with respect to the flat sealing surface of the spring 64. The thin edged walls defining orifice 92 also provides the feature of self-cleaning when combined with a discharge opening 82 of a larger section.

In one working embodiment the operative components of the system have the following characteristics.

| | |
|---|---|
| Spring 64 | Stainless steel .010" thick and 2.5"× .5" |
| Valve fitting 62 | Buna N 60 durometer |
| Nose 74 | End diameter .062" |
| Hub 78 | Diameter .250" |
| Flange 86 | .03" thick, diameter .594" |
| Opening 82 | Diameter .03" |
| Orifice 92 | Diameter .020" × .02" minimum length |

The valve spring moves three sixty-fourths inches approximately between opened and closed positions. The vehicle has a curb height of 17 inches. The collapsed height of the leveler is approximately 12 inches and total compression travel of the shock absorber is approximately 5 inches. The valve closes following a compression travel of approximately 0.23 inches which causes the end 126 to engage the shoulder 27 on end closure 26.

While the embodiments of the present invention, as herein disclosed, constitute a preferred form, it is to be understood that other forms might be adopted.

What is claimed is:

1. In an auxiliary load support and vehicle leveler device of the type including a variable volume chamber having an inlet adapted to be connected to a fluid source and an outlet for the passage of fluid from the variable volume chamber to reduce the load supporting capacity of the device the improvement comprising: a cylindrical member forming part of the variable volume chamber having an opening therethrough, a resilient valve seat element removably supported by said cylindrical member through the opening therein for replacement from outside said cylindrical member, said valve seat element having a nose portion located inside the chamber and an outlet opening on the exterior of said cylindrical member, a passageway communicating said outlet opening with the variable volume chamber, a spring valving member within said chamber supported adjacent the nose portion of said resilient valve seat element having a first portion where it engages said valve seat element for closing the passageway therethrough and a second position where it is spaced from the valve seat for allowing flow through said passageway, said nose portion having a flexible response as said valving member seats thereagainst to produce compression of said nose portion between said valving member and said cylindrical member, an actuator arm movable in response to the fluid volume of the variable volume chamber for positioning the valving member in its opened relationship with respect to said valve seat element when the volume of the device is increased above a predetermined value as the vehicle is unloaded and to position said valving member closed when the volume of the chamber is reduced below the predetermined value as the vehicle is loaded, said valving element being located between said nose portion and said actuator arm and having a portion thereon biasing said actuator arm away from said nose portion, said nose portion and said valving element yielding when said actuator arm closes said valving element to allow accommodation of overtravel movement of said actuator arm toward said cylindrical member.

2. A combination vehicle leveler device and control valve comprising means adapted to be connected to the sprung mass of a vehicle including an outer cylindrical member, means adapted to be connected to the unsprung mass of a vehicle including an inner cylindrical member having an abutment thereon, a movable seal element supported between said inner and outer cylindrical members for allowing relative movement therebetween and defining therewith a variable volume chamber, means adapted to be connected to a source of fluid pressure for changing the amount of fluid within said variable volume chamber to control the load supporting capacity of the device, a resilient valve seat element supported by said outer cylindrical member for replacement from exteriorly of said member, said seat element including a passageway therethrough for flow of fluid from within said variable volume chamber outwardly thereof, a support bracket inside said outer cylindrical member, a spring valving element supported on said bracket in overlying relationship to said valve seat element having a first position in spaced relationship to said seat element for allowing free exhaust therethrough of excess fluid from the variable volume chamber and a second position in engagement with said seat element to trap fluid in said chamber, a valve actuator in engagement with said spring valving element having one end thereon supported on said bracket and an opposite end thereon biased by said valving element toward said inner cylindrical member, said opposite end of said actuator arm being pivoted about said one end upon engagement of said opposite end with said abutment to move said valving element to close the passageway through said seat element for blocking exhaust of excess fluid flow to said variable volume chamber whereby flow of fluid into the device increases the pressure within said chamber to increase the load supporting characteristics of the device.

3. A combination shock absorber and air spring device having an integral exhaust valve control for leveling a vehicle comprising; the combination of an outer rigid cylindrical member, a shock absorber having an outer cylindrical member closed at the top and bottom thereof by end closures thereon, seal means allowing relative telescoping movement between said outer rigid cylindrical member and said shock absorber cylindrical member, a piston rod directed through one of said end closures and having the end thereof connected to said rigid cylindrical member for causing movement of said piston rod into and out of said shock absorber cylindrical member upon relative telescoping movement thereof with said outer cylindrical member, seal means connected between said cylindrical members for defining a variable volume pressurizable chamber within said outer rigid cylindrical member and for allowing relative telescoping movement between said cylindrical members, a resilient valve seat element directed through said outer cylindrical member being removably located with respect thereto for replacement from outside said outer member, said resilient valve seat element including an outlet opening therein on the outer surface of said outer cylindrical member and a passageway communicating said outlet with the interior of the cylindrical member for controlling exhaust flow of fluid from the variable volume chamber, a movable spring supported in spaced relationship with respect to said resilient element, an actuator arm having first and second ends thereon, means for connecting one of said actuator arm ends pivotally to said outer cylindrical wall, said spring engaging said actuator arm for biasing it into the interior of said variable volume chamber, said means for connecting said actuator arm positioning it to locate the other end of said actuator arm at a first control position on the end closure of said shock absorber when the vehicle is unloaded, said spring being located in spaced relationship to the seal element when the arm is in its first control position to allow exhaust of fluid from the variable volume chamber, said actuator arm having a second control position following a short compression of the shock absorber to deflect said spring against said resilient seat element for preventing exhaust flow of fluid from said variable volume chamber therethrough, said actuator arm having an overtravel position wherein it is located between the side of the shock absorber to deform said spring outwardly of said arm to cause said spring to distort said valve seat element between said spring and said outer cylinder member to prevent exhaust flow and to permit concurrent, non-interference retraction of said arm between said outer cylindrical member and said shock absorber cylindrical member.

4. An integral valve assembly for association with an auxiliary load supporting device of the type including a pair of spaced support members adapted to be connected to the sprung and unsprung mass of a vehicle, a movable abutment and a variable volume chamber therebetween connect to a source of pressure for varying the height relationship between the first and second support members thereon comprising; a rigid hollow cylindrical member forming part of the variable volume chamber, a resilient valve seat element supported by said cylindrical member having an outlet opening on the outside of said member and including an inlet opening located within the variable volume chamber, an elongated spring valving element having a free end, support means for fixedly securing one end of said spring against movement, means for guidingly supporting the free end for limited movement with respect to said seat element, an actuator arm having an opening in one end thereof pivotally connected to the free end of said valving element for rolling movement with respect thereto, said valving element engaging said arm to bias it interiorly of the variable volume chamber for engagement with the movable abutment, said spring valving element assuming a straight line configuration between its fixed end and the guided free end thereof to be spaced from said seat when the vehicle is above a predetermined desired height relationship to allow free flow of fluid from said variable volume chamber through said passageway and the outlet, said valving element being engaged by said actuator arm when the chamber volume is reduced below a predetermined value to cause the spring valving element to be bowed between the fixed end and the free end thereof with a mid-segment of said spring valving element engaging said seat element to prevent exhaust of fluid from the variable volume chamber thereby to increase the load carrying capacity of the device when fluid from the source of pressure is directed interiorly of the variable volume chamber.

5. In a combination shock absorber and air spring unit of the type including a variable volume air chamber formed by a rigid cylindrical member, the outer cylinder of the shock absorber and a resilient seal connected to one of the cylindrical members for forming a variable volume chamber therebetween having a fluid inlet and a fluid outlet thereto the improvement comprising; means forming a depression in the outer wall of said rigid cylindrical member, a resilient valve seat element removably secured through said rigid cylindrical member within the depression therein for replacement from outside said member and for protection against accidental displacement from the member, said valve seat element including a transverse outlet on one side of said wall and passageway means communicating said outlet with the interior of said variable volume chamber, an annular flange on said resilient element engaging said rigid cylindrical member at the outer surface thereof around said depression to form a dust guard for said valve seat outlet, and an orifice opening between said outlet opening and said passageway for controlling the rate of exhaust of fluid from said variable volume chamber through said passageway.

6. A multi-function unitary resilient valve fitting comprising a hub having a transverse outlet opening therein, an extension from said hub having an axial passageway communicating perpendicularly with said outlet opening and an orifice opening in said fitting between said outlet opening and said passageway for controlling the rate of exhaust of fluid through said passageway, said orifice opening located on one side of said axial passageway and colinear of said transverse outlet, said orifice opening being of a smaller dimension than both said passageway and the outlet opening and including flexible walls permitting discharge of particles from said passageway into said outlet opening.

7. A multi-function unitary resilient valve fitting comprising a hub having a transverse outlet opening therein, an extension from said hub having an axial passageway communicating perpendicularly with said outlet opening and an orifice opening in said fitting between said outlet opening and said passageway for controlling the rate of exhaust of fluid through said passageway, said orifice opening located on one side of said passageway and colinear of said transverse outlet, said orifice opening being of a smaller dimension than the outlet opening and including flexible walls permitting discharge of particles from said passageway into said outlet opening, a conically shaped nose portion on said extension defining a flexible valve seat adapted to yieldably receive a valving member as it moves transversely of said nose portion into sealed seated engagement with said nose portion.

8. In a combination shock absorber and air spring unit of the type including a variable volume air chamber formed by a rigid cylindrical member, the outer cylinder of the shock absorber and a resilient seal connected to one of the cylindrical members for forming a variable volume chamber therebetween having a fluid inlet and a fluid outlet thereto the improvement comprising; means forming a depression in the outer wall of said rigid cylindrical member, a resilient valve seat element fixedly secured through said rigid cylindrical member at the depression therein for replacement from outside said member and for protection against accidental displacement from the member, said valve seat element including an outlet on one side of said wall and passageway means communicating said outlet with the interior of said variable volume chamber, an annular flange on said resilient member engaging said rigid cylindrical member at the outer surface thereof around said pressure to form a dust guard for said valve seat outlet, an orifice between said outlet opening and said passageway for controlling the rate of exhaust of fluid from said variable volume chamber through said passageway, said orifice being of a smaller dimension than the outlet opening and including flexible walls permitting discharge of particles from said passageway into said outlet opening, a bracket fixedly secured to the inside surface of said rigid cylindrical member, an elongated movable spring element supported by said bracket, means on said bracket for fixedly securing one end of said spring element, a guide slot on said bracket receiving the opposite end of said spring element, said spring element being maintained normally biased against one side of said slot wherein said spring is located in spaced relationship to allow exhaust of fluid from the variable volume chamber through said valve seat element, an actuator arm having a first curved end thereon supported for rolling movement on said bracket at the slot therein, said curved end having an opening therein through which said spring is directed, said actuator arm having a second curved end directed inwardly of the variable volume chamber and located above the top end of the shock absorber cylinder when the vehicle is unloaded and located against the side of the cylinder when the vehicle is loaded, said actuator arm when located above the top end of the shock absorber cylinder having the first end thereof positioned on said bracket to cause the spring to assume its first position, said second curved end when engaging the side of said shock absorber cylinder positioning said first end to locate said spring against the opposite side of said slot and causing the arm between said first and second curved ends thereof to deflect said spring to sealingly engage said resilient seat element for blocking flow of exhaust fluid through the passageway therein when the vehicle is so loaded whereby fluid flow through the inlet of the unit is trapped in the variable volume cavity to increase the load carrying capacity of the unit for returning the vehicle to a desired level position.

* * * * *